US008570843B2

(12) United States Patent
Hirata et al.

(10) Patent No.: US 8,570,843 B2
(45) Date of Patent: Oct. 29, 2013

(54) THERMALLY ASSISTED MAGNETIC HEAD, MAGNETIC HEAD DEVICE AND MAGNETIC RECORDING/REPRODUCING APPARATUS INCLUDING A RECORDING ELEMENT AND A NEAR-FIELD LIGHT GENERATING ELEMENT

(75) Inventors: Kei Hirata, Tokyo (JP); Kosuke Tanaka, Tokyo (JP); Tsutomu Chou, Tokyo (JP); Susumu Aoki, Tokyo (JP); Makoto Isogai, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/402,318

(22) Filed: Feb. 22, 2012

(65) Prior Publication Data

US 2013/0215725 A1   Aug. 22, 2013

(51) Int. Cl.
*G11B 11/00* (2006.01)
(52) U.S. Cl.
USPC .................................... 369/13.33; 369/13.13
(58) Field of Classification Search
USPC .......... 369/13.33, 13.13, 13.32, 13.02, 13.17, 369/112.09, 112.14, 112.21, 112.27, 300; 360/59; 385/129, 32, 88–94; 29/603.07–603.27; 250/201.3, 201.5
See application file for complete search history.

(56) References Cited

U.S. PATENT DOCUMENTS

| | | | |
|---|---|---|---|
| 8,315,129 B1 * | 11/2012 | Komura et al. | 369/13.33 |
| 2010/0046111 A1 * | 2/2010 | Hirata et al. | 369/13.33 |
| 2011/0205661 A1 * | 8/2011 | Komura et al. | 360/59 |
| 2012/0026629 A1 | 2/2012 | Hirata et al. | |
| 2012/0075967 A1 * | 3/2012 | Chou et al. | 369/13.33 |

FOREIGN PATENT DOCUMENTS

| | | |
|---|---|---|
| JP | 2004-158067 | 6/2004 |
| JP | 2007-257815 | 10/2007 |

OTHER PUBLICATIONS

U.S. Appl. No. 12/961,939, filed Dec. 7, 2010, Ota, et al.
U.S. Appl. No. 13/402,128, filed Feb. 22, 2012, Isogai, et al.

* cited by examiner

*Primary Examiner* — Tan X Dinh
(74) *Attorney, Agent, or Firm* — Oblon, Spivak, McClelland, Maier & Neustadt, L.L.P.

(57) ABSTRACT

The present invention provides a thermally assisted magnetic head with improved recording performance. The thermally assisted magnetic head includes a recording element and a near-field light generating element. The recording element includes a main pole appearing on a medium-facing surface, and a bit inversion starting region intended to be a maximum recording magnetic field generating position is formed at a leading edge of the main pole. The near-field light generating element is located on a leading side of the main pole and capable of creating a heating spot due to a near-field light on a near-field light generating end face appearing on the medium-facing surface. The bit inversion starting region is located within one-half of a diameter of the heating spot from a center of the heating spot.

17 Claims, 14 Drawing Sheets

THERMALLY ASSISTED MAGNETIC HEAD, MAGNETIC HEAD DEVICE AND MAGNETIC RECORDING/REPRODUCING APPARATUS INCLUDING A RECORDING ELEMENT AND A NEAR-FIELD LIGHT GENERATING ELEMENT

TECHNICAL FIELD

The present invention relates to a thermally assisted magnetic head, a magnetic head device and a magnetic recording/reproducing apparatus.

BACKGROUND OF THE INVENTION

As a magnetic recording technology for meeting the demand of increasing the recording density of magnetic recording, a thermally assisted magnetic recording method has been known as disclosed in Japanese Unexamined Patent Application Publication No. 2004-158067, in which data writing is performed while locally reducing the coercivity of a magnetic recording medium such that a near-field light is generated from a near-field light generating element by using a laser beam and the magnetic recording medium is heated by heat of the near-field light.

Thermally assisted magnetic heads used in the thermally assisted magnetic recording method include three major elements as an essential part of a recording element: an optical waveguide for introducing a laser beam; a surface plasmon generating element; and a magnetic pole for generating a recording magnetic field. The optical waveguide comprises a metal oxide or nitride, the surface plasmon generating element comprises a metal, and the magnetic pole comprises a magnetic material.

Among the three major elements, in order to maximize the penetrability of the laser beam passing through the optical waveguide, it is preferable to adopt a basic configuration in which a high refractive index material is covered with a low refractive index material and not to put a light-reflecting, scattering metallic body around the optical waveguide.

In order to increase the recording magnetic field, on the other hand, the main pole and a magnetic shield (leading shield) have to be brought close to each other with a small gap therebetween, which makes it difficult to satisfy the requirement of not having the metallic body around the optical wave guide.

In the thermally assisted recording method, moreover, it is important to maximize the effective magnetic field gradient by disposing the surface plasmon generating element as close as possible to a maximum point of the recording magnetic field, thereby increasing the linear recording density. Furthermore, it may also be required to design the surface plasmon generating element in a complicated shape so as to increase plasmon propagation efficiency and heat dissipation.

In the thermally assisted magnetic head, as described above, trying to improve performance of one of the three major elements constituting the recording element may result in deteriorating performance of the other elements, so that it is technically difficult to ensure well-balanced performance for all the three major elements.

SUMMARY OF THE INVENTION

It is an object of the present invention to provide a thermally assisted magnetic head in which recording performance is improved by optimizing a relationship between a main pole of a recording element and a heating spot by a near-field light generating element, and a magnetic head device and a magnetic recording/reproducing apparatus.

It is another object of the present invention to provide a thermally assisted magnetic head in which high performance is achieved in propagative efficiency, optical coupling efficiency, recording spot and recording magnetic field by optimizing a relationship between major elements constituting a recording element and a near-field light generating element, and a magnetic head device and a magnetic recording/reproducing apparatus.

In order to attain the above object, a thermally assisted magnetic head according to the present invention comprises a recording element and a near-field light generating element. The recording element includes a main pole with a bit inversion starting region which is intended to be a maximum recording magnetic field generating position and formed at a leading edge of the main pole appearing on a medium-facing surface. The near-field light generating element is located on a leading side of the main pole and capable of creating a heating spot due to a near-field light on a near-field light generating end face appearing on the medium-facing surface.

The bit inversion starting region is located within one-half of a diameter of the heating spot from a center of the heating spot.

As described above, since the thermally assisted magnetic head according to the present invention includes the near-field light generating element and the near-field light generating element creates the heating spot due to the near-field light on the near-field light generating end face appearing on the medium-facing surface, a magnetic recording layer of a magnetic recording medium can be heated with a heating spot surface due to the near-field light at the magnetic recording layer of the magnetic recording medium. When the magnetic recording layer of the magnetic recording medium is heated, the coercivity is lowered to enable data writing.

The recording element has the bit inversion region formed at the leading edge of the main pole appearing on the medium-facing surface. The near-field light generating element is located on the leading side of the main pole. With this configuration, regardless of the thickness of the main pole in the trailing direction or the range of the heating spot, writing onto the magnetic recording layer of the magnetic recording medium can always be performed at the leading edge of the main pole after the magnetic recording layer of the magnetic recording medium is heated by the near-field light.

The bit inversion starting region intended to be a maximum recording magnetic field generating position is located within one-half of the diameter of the heating spot from the center of the heating spot. With this arrangement, the maximum recording magnetic field generating position can be located close to the heating center, so that writing can be performed after a magnetic recording material constituting the magnetic recording layer is heated close to the Curie point. Heating the magnetic recording medium close to the Curie point results in increasing temperature gradient of coercivity. Moreover, temperature gradient of heat generated from the thermally assisted magnetic head and effective magnetic field gradient increase as the maximum recording magnetic field generating position approaches the center of the heating spot, making it possible to achieve high recording density.

The thermally assisted magnetic head according to the present invention can be combined with a head support device to provide a magnetic head device, and the magnetic head device can be combined with a magnetic recording medium to provide a magnetic recording/reproducing apparatus.

The other objects, constructions and advantages of the present invention will be further detailed below with reference to the attached drawings. However, the attached drawings show only illustrative examples.

DESCRIPTION OF THE PREFERRED EMBODIMENTS

1. Thermally Assisted Magnetic Head

Figure 1:
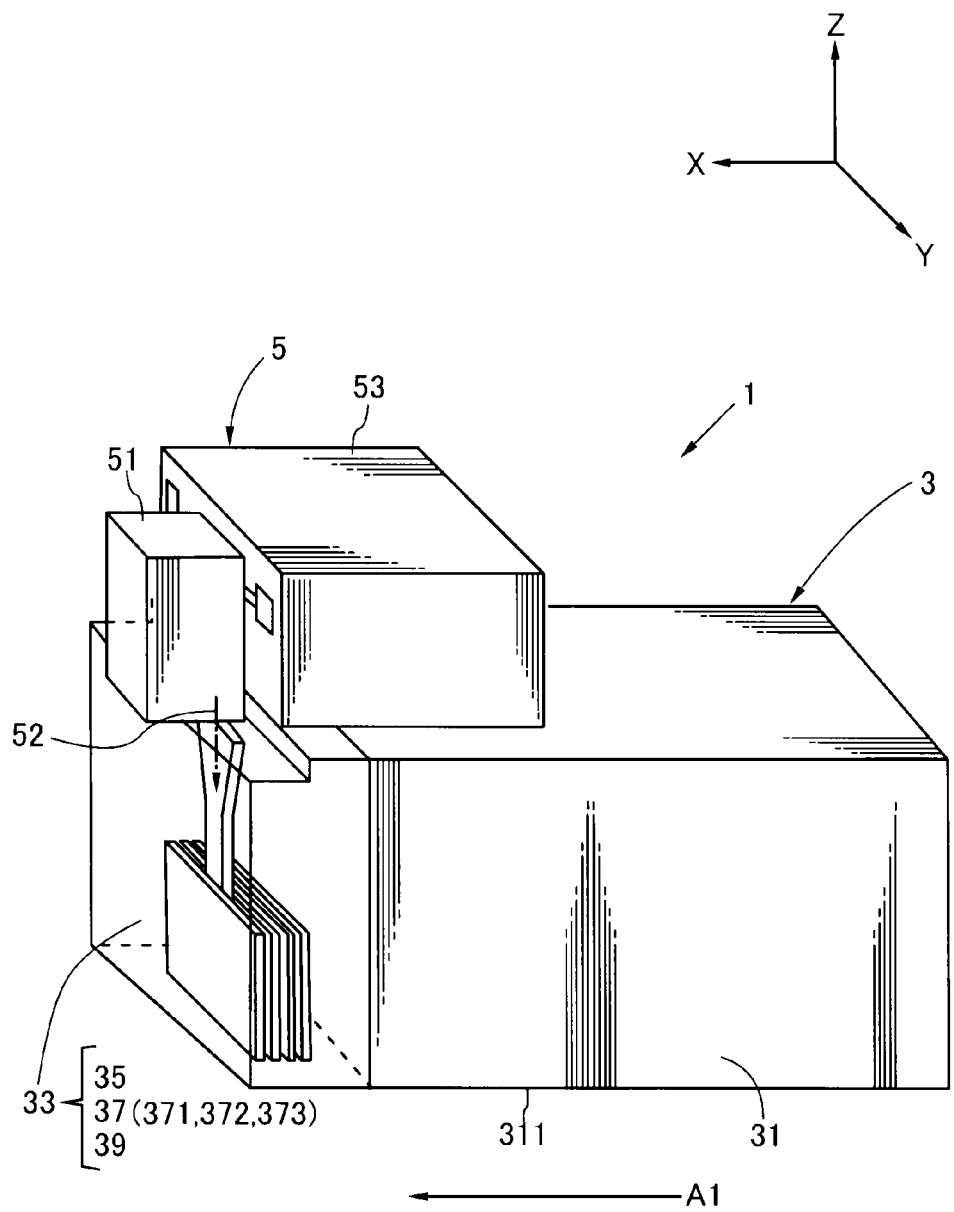
FIG. 1 is a perspective view showing a thermally assisted magnetic head according to the present invention.

A thermally assisted magnetic head 1 shown in FIG. 1 comprises a slider 3 and a light source unit 5. The slider 3 has a slider substrate 31 and a head element part 33, wherein the head element part 33 is located at a trailing-side (X-axis direction) end of the slider substrate 31 as seen in an airflow direction A1 in a medium-facing surface 311 of the slider 3. The head element part 33 includes a recording element 35, a near-field light generating element 37 and a reproducing element 39. The near-field light generating element 37 includes a surface plasmon generating element 372 and an optical waveguide 373.

The slider 3 comprises $Al_2O_3$—TiC or the like. The medium-facing surface 311 is an air bearing surface (ABS) and geometrically shaped (omitted in the drawings) so as to control floating characteristics.

The recording element 35, the surface plasmon generating element 372, the optical waveguide 373 and the reproducing element 39 constituting the head element part 33 are stacked on the trailing side (X-axis direction) of the slider substrate 31, which is the side having an air outflow end, by using high-precision patterning technologies including a photolithography process and so on and covered with an insulating protective film such as alumina. Typically, the recording element 35 has a magnetic circuit and a magnetic pole structure suitable for perpendicular magnetic recording.

The surface plasmon generating element 372 is optically connected to the optical waveguide 373 for propagating an incident light and excites surface plasmon so as to generate a near-field light at a near-field light generating end face 371 laying in the medium-facing surface 311 of the head element part 33. A magnetic recording layer of a magnetic recording medium can be heated by the near-field light.

The recording element 35 is disposed adjacent the near-field light generating element 37 so as to perform magnetic recording on the magnetic recording layer whose coercivity has been lowered by heating with the near-field light.

The reproducing element 39 may be a current-in-plane giant magneto-resistance (CIP-GMR) element, a current-perpendicular-to-plane giant magneto-resistance (CPP-GMR) element or a tunneling magneto-resistance (TMR) element.

The light source unit 5 comprises a laser diode chip (hereinafter referred to as LD chip) 51 and a holder 53 supporting it and is disposed on a back surface of the slider 3 opposite from the ABS 311. The LD chip 51 is optically connected to the waveguide 373 in a minus Z-axis direction. The LD chip 51 has a laser diode within. The laser diode may be one from which a laser beam having a wavelength within the range of 375 nm to 1.7 μm can be emitted as an incident light 52. Specifically, it may be an InP-based, GaAs-based or GaN-based laser diode, for example.

At one end face, the holder 53 is joined to the back surface of the slider 3, for example, through an adhesive or solder. In general, the holder 53 is provided with a monitor for monitoring and controlling the intensity of the incident light 52 (laser beam) emitted from the laser diode of the LD chip 51 or the like.

Figure 2:
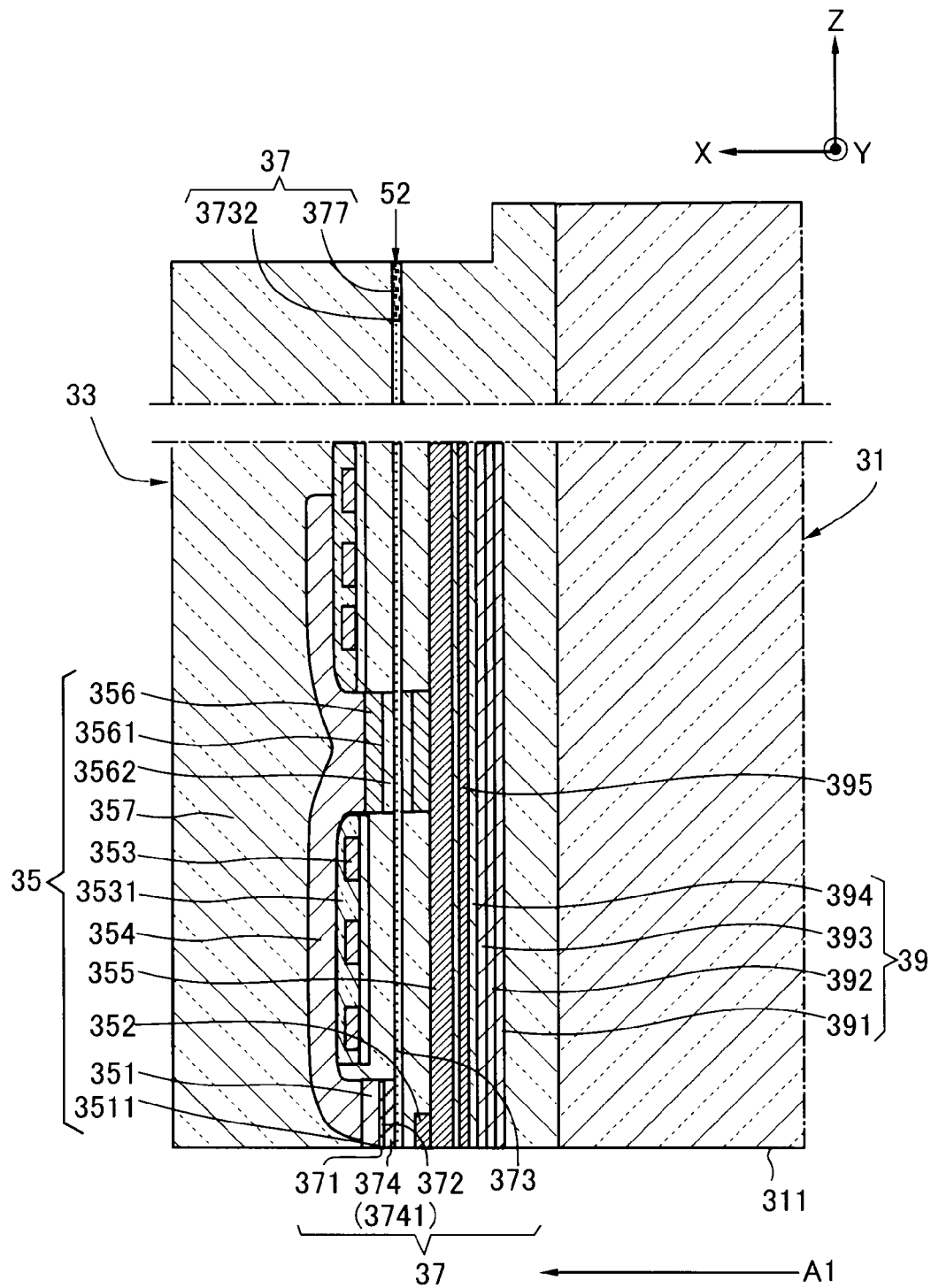
FIG. 2 is a partially omitted sectional side view of FIG. 1.

FIG. 2 is a partially omitted sectional side view of FIG. 1, schematically showing a configuration of the head element part 33 and its surroundings. In the head element part 33, the reproducing element 39 includes an MR stack 391, a lower shield layer 392, an upper shield layer 393 and a reproducing element insulating layer 394 and is formed on a foundation layer 357 comprising an insulating material such as $Al_2O_3$. The MR stack 391 is a magneto-sensitive part which senses a signal magnetic field by using the MR effect.

On the other hand, the recording element 35 includes a main pole 351, a leading shield 352, a write coil layer 353, an upper yoke layer 354, a lower yoke layer 355 and a coil insulating layer 3531. The main pole 351 has a trapezoidal shape at a tip appearing on the medium-facing surface 311 and generates a recording magnetic field from a leading edge 3511 corresponding to the upper side directed to the leading side. The recording magnetic field creates a bit inversion starting region F1 at the leading edge 3511, so that data writing onto the magnetic recording medium can be performed at the bit inversion starting region F1. The main pole 351 comprises a soft magnetic material. Examples of the soft magnetic material include soft magnetic iron-based alloy materials such as FeNi, FeCo, FeCoNi, FeN and FeZrN.

On an insulating layer comprising an insulating material such as $Al_2O_3$ and formed on an insulating layer, the write coil layer 353 is formed to pass through at least between the upper yoke layer 354 and the lower yoke layer 355 for every turn and wound about a back contact 356. In the above, for example, a coil insulating layer 3531 comprising a heat-cured insulating material such as photoresist covers the write coil layer 353, thereby providing electrical insulation between the write coil layer 353 and the upper yoke layer 354. Although formed as a single layer in the present embodiment, the write coil layer 353 may have two or more layers or may be a helical layer. Moreover, the number of turns is not limited to that in FIG. 2. For example, it may have 2 to 7 turns.

The back contact 356 has a through hole 3561, and the optical waveguide 373 and a through hole insulating layer 3562 covering the optical waveguide 373 extend through the through hole 3561.

The near-field light generating element 37 has a spot size conversion element 377 in addition to the surface plasmon generating element 372 and the optical waveguide 373. Then, after the spot size of the incident light 52 from the light source unit 5 has been converted by the spot size conversion element 377, the incident light 52 enters a light-receiving end face 3732 of the optical waveguide 373 and propagates through the optical waveguide 373. The optical waveguide 373 extends from the light-receiving end face 3732, through the through hole 3561 provided in the back contact 356, to the medium-facing surface 311 which is an end face of the head.

The surface plasmon generating element 372 converts the incident light 52 having propagated through the optical waveguide 373 to a near-field light. The surface plasmon generating element 372 and the optical waveguide 373 are disposed between the main pole 351 and the leading shield 352. In addition, the surface plasmon generating element 372 and the optical waveguide 373 are opposed to each other at a predetermined distance, so that the part where they are opposed to each other serves as an optical connection 374. The optical connection 374 comprises a buffer 3741 having a lower refractive index than the optical waveguide 373.

When the surface plasmon generating element 372 is irradiated with the incident light 52, so-called surface plasmon, which refers to a state where free electrons on the surface are uniformly oscillated with an electric field of the incident light 52, can be excited and emitted as an intense near-field light from the near-field light generating end face 371 appearing on the medium-facing surface 311 after having propagated through the surface plasmon generating element 372. The near-field light can realize a small size heating spot without being limited by the light diffraction limit and heats the magnetic recording layer of the magnetic recording medium within the heating spot. With this heating, the coercivity can be lowered, so that the magnetic recording layer of the magnetic recording medium can be magnetized in the direction of a recording magnetic field.

Moreover, an inter-element shield 395 layer sandwiched between insulating layers is disposed between the reproducing element 39 and the lower yoke layer 355. The inter-element shield 395 layer can comprise a soft magnetic material and acts as a shield which protects the reproducing element 39 against a magnetic field generated from the recording element 35.

Figure 3:
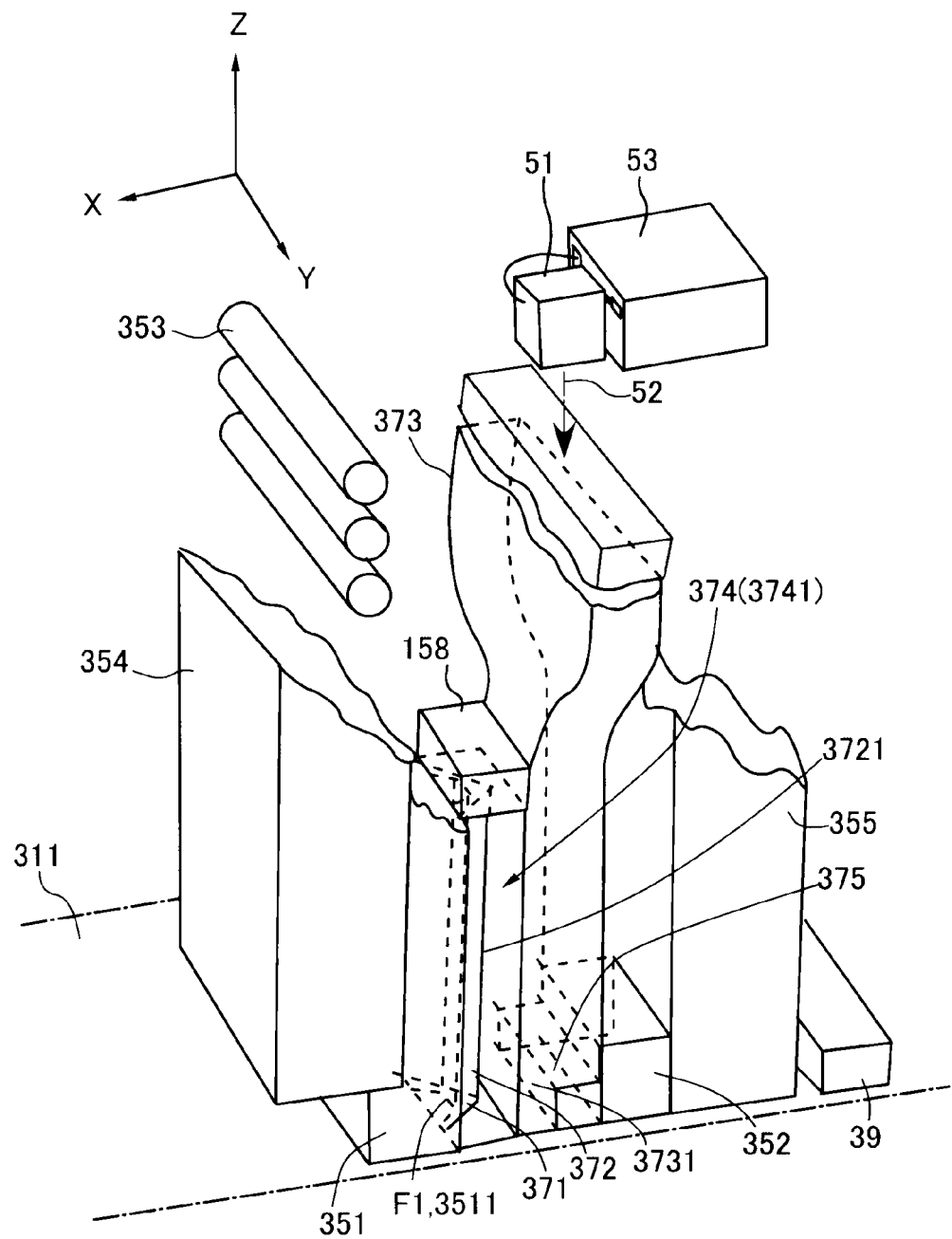
FIG. 3 is a perspective view showing an arrangement of major elements in FIG. 2.

FIG. 3 shows an arrangement of major elements shown in FIG. 2. Referring to FIG. 3, The leading shield 352 is located on a leading side (minus X-axis direction) of the main pole 351 and magnetically connected to the main pole 351. The leading shield 352 serves the function of taking in a recording magnetic field spreading from the main pole 351, wherein effective magnetic field gradient increases with an increase in recording magnetic field gradient, which results in increasing recording density. The leading shield 352 preferably comprises NiFe or CoNiFe having a high saturation magnetic flux density or an iron-based alloy material similar to that of the main pole 351.

On the other hand, the near-field light generating element 37 has the near-field light generating end face 371 projecting toward the leading side (minus X-axis direction) on the medium-facing surface 311, wherein a heating spot parallel to the near-field light generating end face 371 can be created from the near-field light generating end face 371, and the near-field light generating element 37 is located on the leading side (minus X-axis direction) of the main pole 351. With this configuration, regardless of the thickness of the main pole 351 in the trailing direction (X-axis direction) or the range of the heating spot, data writing onto the magnetic recording medium can always be performed at the bit inversion starting region F1 formed at the leading edge 3511 of the main pole 351 after the magnetic recording medium is heated by the near-field light.

In the near-field light generating element 37, moreover, the surface plasmon generating element 372 is located between the main pole 351 and the leading shield 352. The optical waveguide 373 is located between the surface plasmon generating element 372 and the leading shield 352 and extends in the height direction Z from an optical waveguide end face 3731 of the optical waveguide 373 appearing on the medium-facing surface 311 and has the optical connection 374 with the leading side (minus X-axis direction) of the surface plasmon generating element 372.

Since the near-field light generating element 37 includes the optical waveguide 373, the surface plasmon generating element 372 can be irradiated with the incident light 52 in a concentrated manner through the optical waveguide 373, so that the near-field light can be efficiently generated. That is, although it is known that near-field light generating efficiency, i.e., propagative efficiency (=incident light energy/near-field light output energy) generally decreases when a spot diameter of the incident light 52 is excessively larger than an area of a scatterer for generating the near-field light, the decrease in propagative efficiency can be prevented by providing the optical waveguide 373 as described above.

With the surface plasmon generating element 372, moreover, the incident light 52 propagating through the optical waveguide 373 can be converted into surface plasmon energy at the surface plasmon generating element 372, so that the surface plasmon energy can be emitted as the near-field light from the near-field light generating end face 371.

Figure 4:
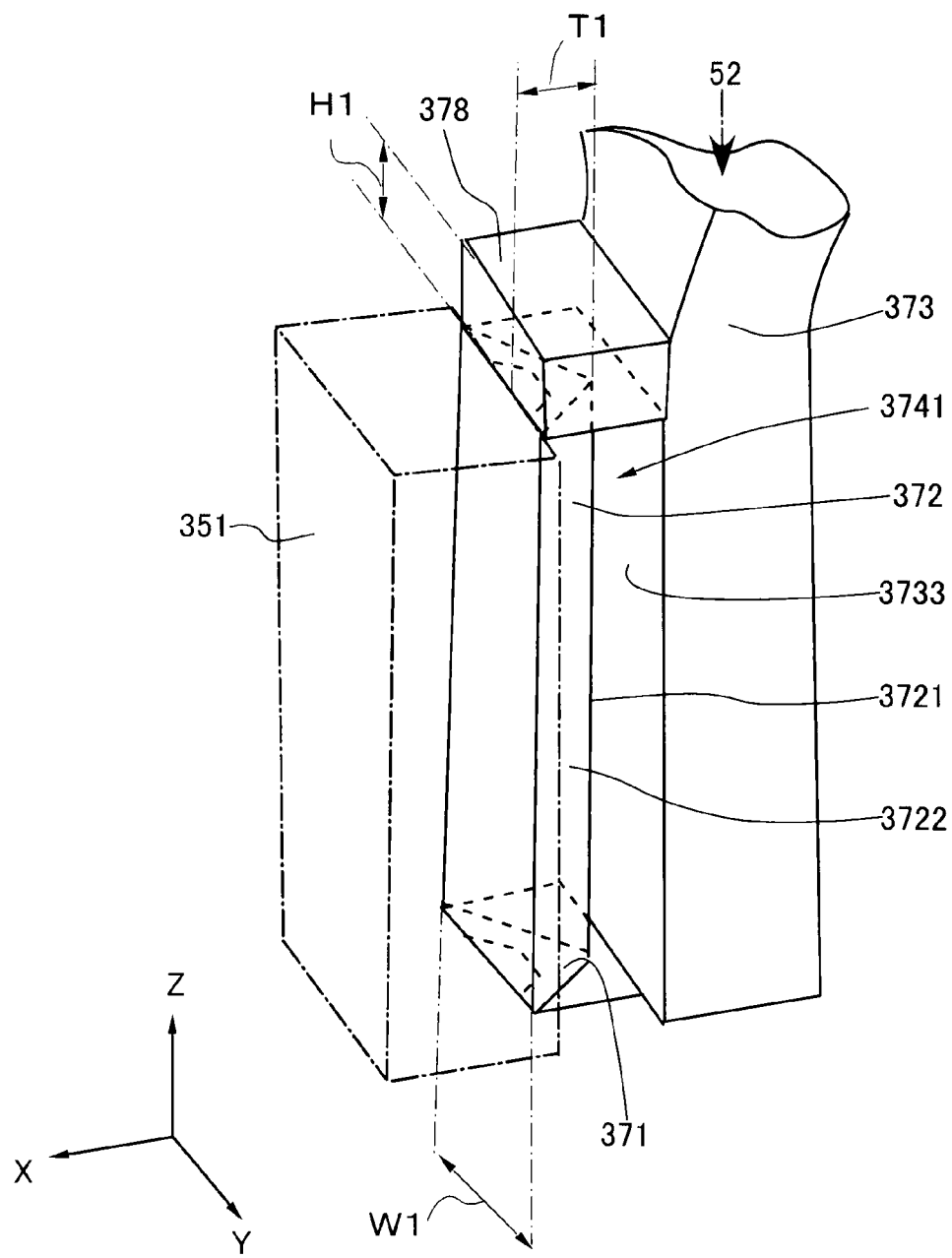
FIG. 4 is an enlarged view of a part between a surface plasmon generating element and an optical waveguide in FIG. 3.

The optical connection between the surface plasmon generating element 372 and the optical waveguide 373 will be described with reference to FIG. 4. FIG. 4 is an enlarged view of a part between the surface plasmon generating element 372 and the optical waveguide 373 in FIG. 3. The surface plasmon generating element 372 is opposed to the optical waveguide 373 with a propagating edge 3721 extending to the near-field light generating end face 371, wherein the surface plasmon (electromagnetic field) excited by the incident light 52 can be emitted from the near-field light generating end face 371 as the near-field light by the propagating edge 3721.

The surface plasmon generating element 372 preferably comprises Au, Ag or an alloy containing it as a main component. Among them, an Ag alloy preferably contains at least one element selected from the group consisting of Pd, Au, Cu, Ru, Rh and Ir. It is also preferable that a width (W1) in a track width direction (Y-axis direction) and a thickness (T1) in a leading direction (minus X-axis direction) are set smaller than a wavelength of the incident light 52.

Moreover, the part located between a part of a trailing-side (X-axis direction) end face 3733 of the optical waveguide 373 and a propagating surface 3722 of the surface plasmon generating element 372 including the propagating edge 3721 acts as the buffer 3741. The buffer 3741 serves the function of coupling the incident light 52 with the surface plasmon generating element 372 in a surface plasmon mode. The buffer 3741 has a lower refractive index than the optical waveguide 373. For example, it comprises a dielectric material. In the case where the laser beam has a wavelength of 600 nm and the optical waveguide 373 comprises $TaO_x$ (refractive index n=2.16), for example, the buffer 3741 may comprise $SiO_2$ (n=1.46) or $Al_2O_3$ (n=1.63).

Moreover, a resonant mirror 378 can be disposed at the side opposite from the near-field light generating end face 371. The resonant mirror 378 constitutes a Fabry-Pérot resonator such that the surface of the magnetic recording layer of the magnetic recording medium opposed to the near-field light generating end face 371 acts as the other mirror and the surface plasmon generating element 372 is located therebetween. The Fabry-Pérot resonator is a resonator having a reflecting mirror at each end of a light (electromagnetic field) propagation path, wherein reflecting surfaces of the reflecting mirrors are opposed to each other. In the resonator, surface plasmon (electromagnetic field) forms a standing wave and increases the amplitude, thereby increasing not only the intensity of the near-field light but also the propagative efficiency. The resonant mirror 378 can comprise a metallic material such as Ag or Cu so as to reflect surface plasmon with a high reflectivity. If a thickness H1 of the resonant mirror 378 in the Z-axis direction is set within the range of 5 to 30 nm, moreover, the sufficient thickness can ensure sufficiently high reflectivity.

One feature of the present invention resides in that the positional relationship between the recording element 35 and the near-field light generating element 37 in the thermally assisted magnetic head 1 thus far described has been improved to enhance performance of the thermally assisted magnetic head 1.

Recording density of the magnetic recording medium depends on effective magnetic field gradient ($dH_{eff}/dx=-dH_c/dT \cdot dT/dx+dH_H/dx$). In the above, $dH_c/dT$ represents temperature gradient of coercivity of the magnetic recording medium. $dT/dx$ represents temperature gradient of heat generated from the head. $dH_H/dx$ represents recording magnetic field gradient to the magnetic recording medium. For increasing the recording density, it is necessary to optimize the relationship between the recording element 35 and the near-field light generating element 37, which affects individual elements of the effective magnetic field gradient.

The present invention is intended to achieve such optimization and characterized in that the bit inversion starting region F1 at the leading edge 3511 of the main pole 351 acts as a maximum recording magnetic field generating position and is located within one-half of a diameter of a heating spot surface HF1 from a heating center HCP1 of the heating spot surface HF1 formed by the heating spot of the near-field light. Characteristic features of the present invention will be described below with reference to FIGS. 4 to 8.

Figure 5:
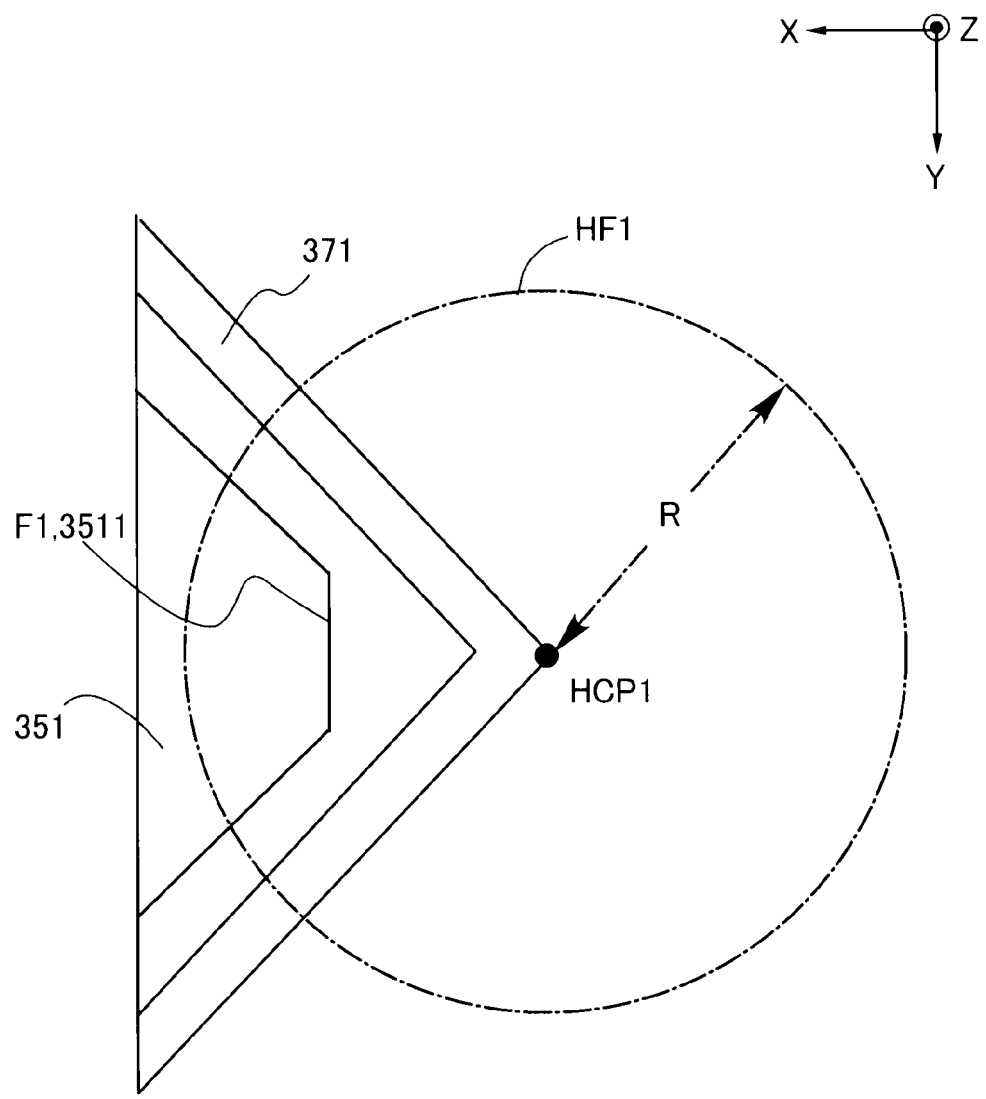
FIG. 5 is a plan view of a heating spot.

FIG. 5 is a plan view of the heating spot surface HF1. Referring to FIG. 5, the heating spot surface HF1 extends in a plane parallel to the near-field light generating end face 371 with a radius R from the heating center HCP1 that is located at the peak of the near-field light generating end face 371. The near-field light can heat the magnetic recording medium within the range of the heating spot. In the heated magnetic recording medium, the coercivity of the magnetic recording layer can be lowered, so that data writing can be performed by magnetizing that part in the direction of the recording magnetic field.

Referring to FIG. 5, moreover, the entire bit inversion starting region F1 is located within the heating spot surface HF1. With this arrangement, data writing can always be performed at the bit inversion starting region F1 after decreasing the coercivity of the magnetic recording medium. In this case, the bit inversion starting region F1 and the heating center HCP1 can be brought close to each other so as to heat the magnetic recording medium material close to the Curie point. Heating the magnetic recording medium close to the Curie point results in increasing temperature gradient of the coercivity of the magnetic recording medium. Moreover, temperature gradient of heat generated from the thermally assisted magnetic head 1 increases as the bit inversion starting region F1 approaches the center of the heating spot. Therefore, it becomes possible to achieve high recording density.

It is also preferable that in the heating spot surface HF1, the main pole 351 does not generate a magnetic field capable of causing reinversion of recorded magnetization on a trailing side (X-axis direction) of the bit inversion starting region F1. This is because if a magnetic field capable of causing reinversion of recorded data exists on the trailing side (X-axis direction) of the bit inversion starting region F1, recorded data may be erased on the trailing side (X-axis direction) of the bit inversion starting region F1.

Figure 6:
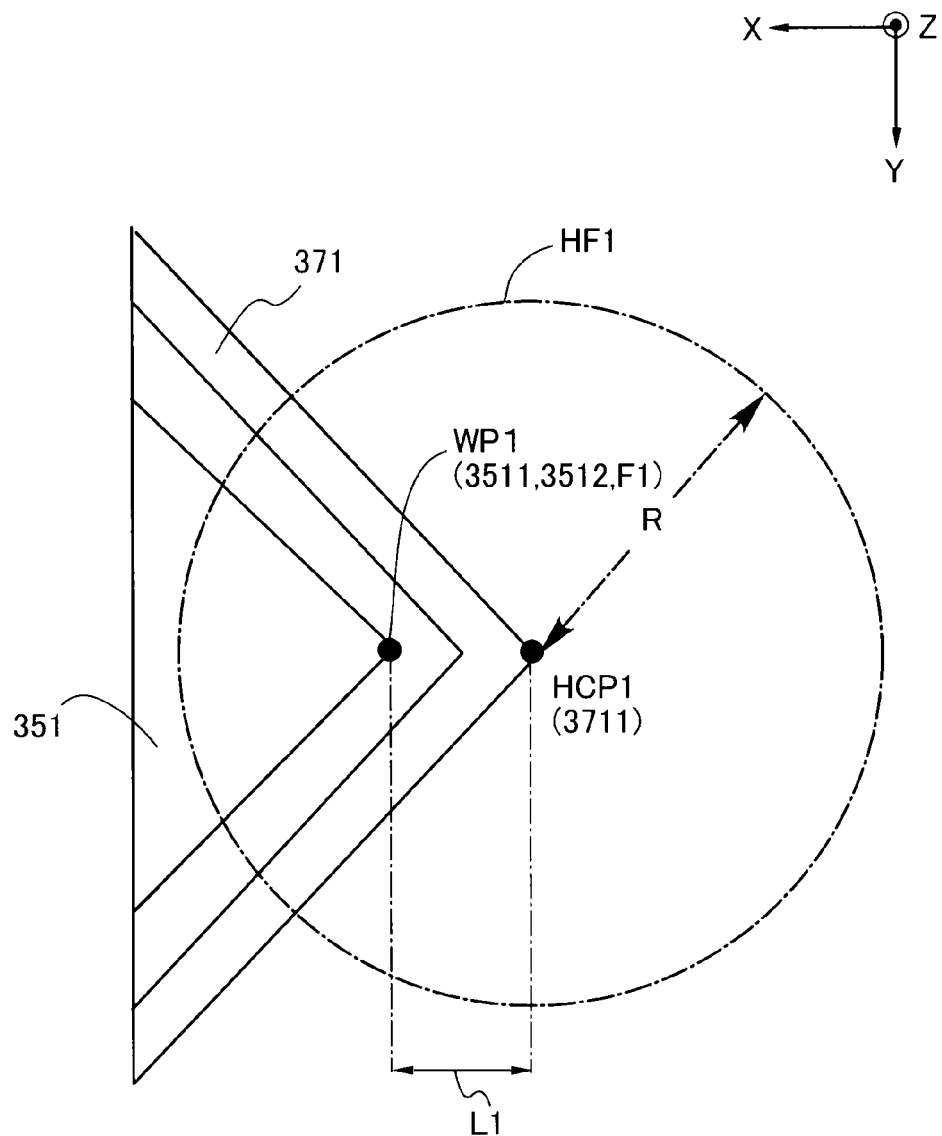
FIG. 6 is a plan view of a heating spot showing a case where a main pole has a different shape from that in FIG. 5.

In order to increase the recording magnetic field gradient, the main pole 351 may take the form shown in FIG. 6, in which the leading edge 3511 is protruded. In this case, a maximum recording magnetic field point WP1 appears at the tip of the main pole 351 as the bit inversion starting region In this case, since writing can be performed by using the maximum recording magnetic field, recording density can be improved. Moreover, a distance L1 between the maximum recording magnetic field point WP1 and the heating center HCP1 can be set to a desired small value by adjusting a thickness between a peak 3711 of the near-field light generating end face 371 and a peak 3512 of the main pole 351.

Figure 7:
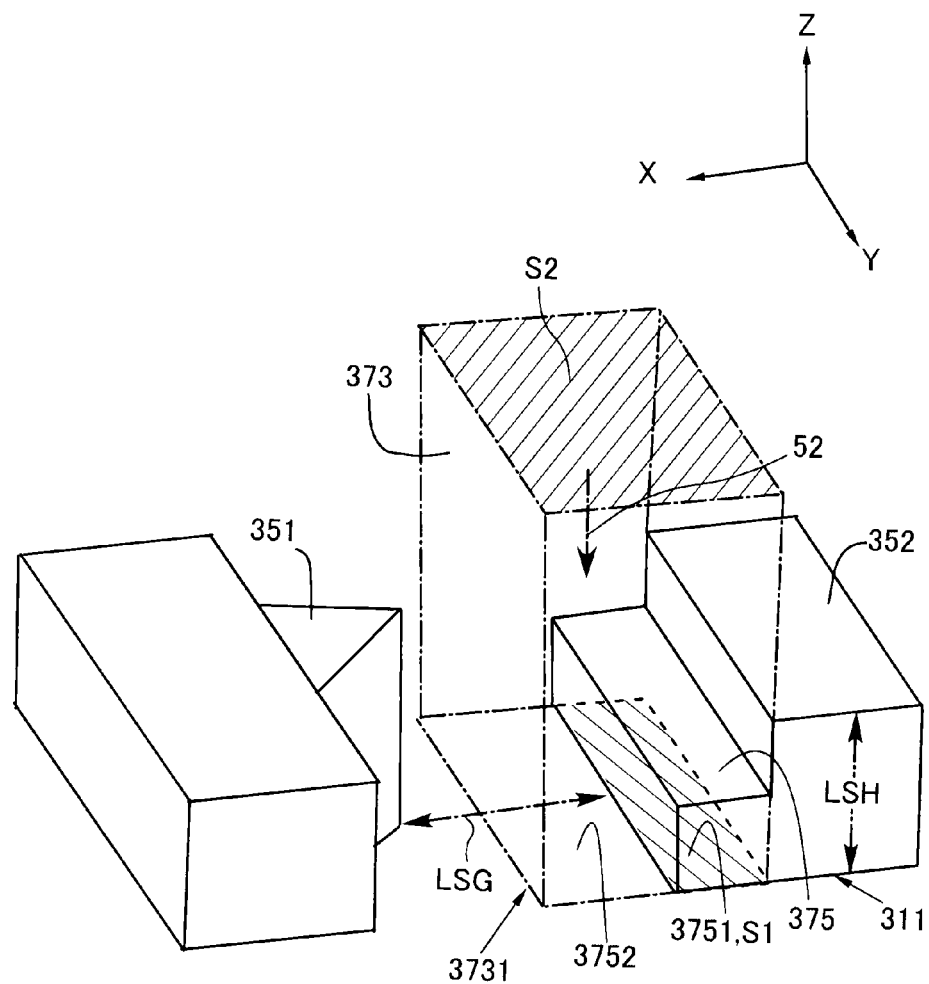
FIG. 7 is a perspective view in which an intrusive part of a leading shield in FIG. 3 is enlarged.
Figure 8:
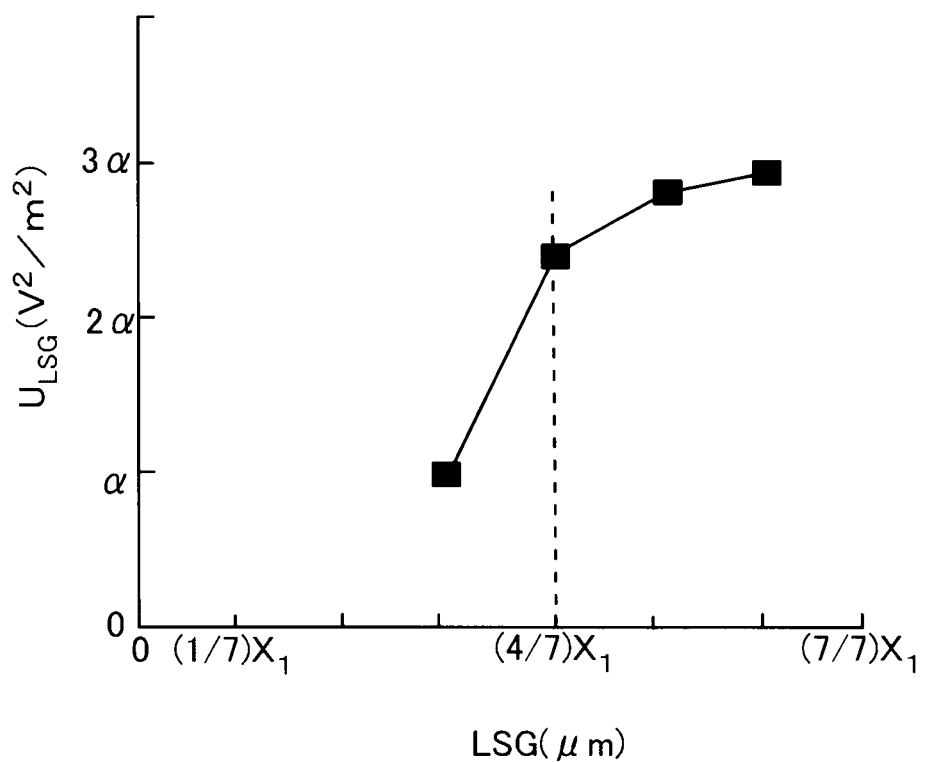
FIG. 8 is a graph showing a relationship between a leading shield gap LSG and a light energy density $U_{LSG}$.
Figure 9:
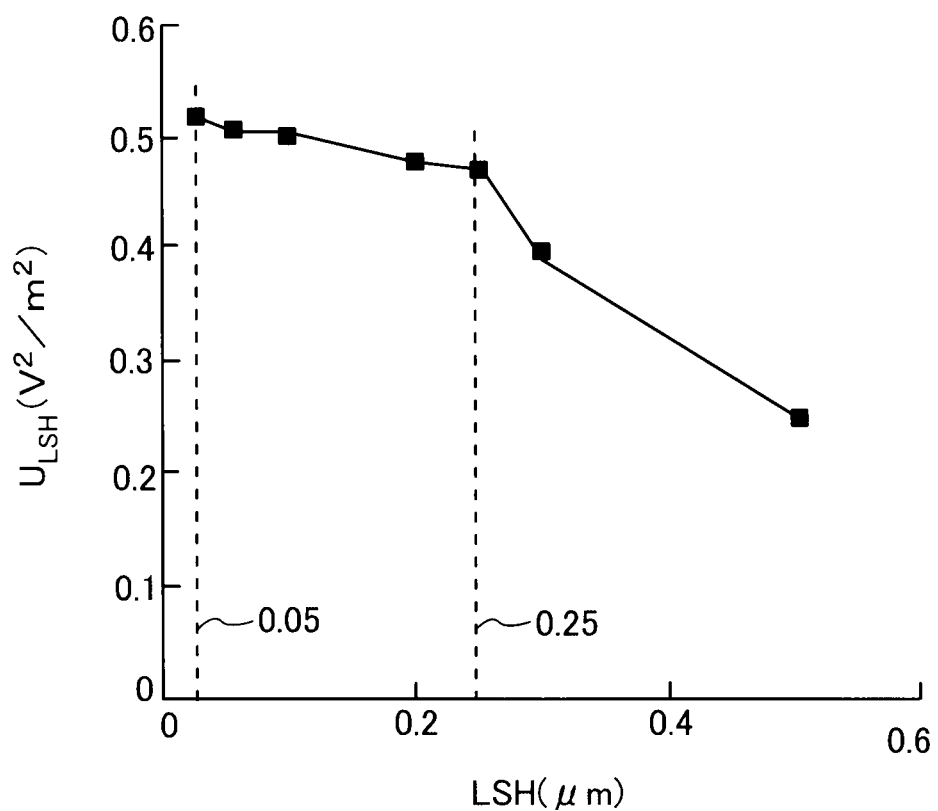
FIG. 9 is a graph showing a relationship between a leading shield height LSH and a light energy density $U_{LSH}$.

Next will be described an intrusive part 375 of the leading shield 352 into the optical waveguide end face 3731 with reference to FIGS. 7 to 9. From the viewpoint of preventing a reduction in propagative efficiency, an area S1 of the intrusive part 375 is preferably equal to or less than one-half of an area S2 of the optical waveguide end face 3731. By providing the leading shield 352 with the intrusive part 375 into the optical waveguide 373, the main pole 351 and the leading shield 352 can be brought close to each other, so that the effective magnetic field gradient can be increased.

Providing the above intrusive part 375 results in decreasing a distance (leading shield gap LSG) between the leading shield 352 and the main pole 351, so that the recording magnetic field can be increased as compared with the case where the optical waveguide end face 3731 consists only of an uncovered part 3752, which leads to increasing the recording magnetic field gradient.

Regarding bringing the leading shield 352 close to the main pole 351, i.e., regarding decreasing the leading shield gap LSG, as described above, it should be taken into consideration that the optical waveguide 373 for generating the near-field light is disposed between the main pole 351 and the leading shield 352.

It is confirmed that the more the leading shield 352 approaches the main pole 351, the larger a covered part 3751 of the optical waveguide 373 becomes, which results in increasing the recording magnetic field gradient but also leads to decreasing the propagative efficiency. In this regard, FIG. 8 is a graph showing a relationship between the leading shield gap LSG and a light energy density $U_{LSG}$ of the incident light 52 to be transmitted to the near-field light generating element 37. In FIG. 8, the leading shield gap LSG is relatively expressed based on a distance $X_1$ from the main pole 351 to the leading-shield-side end face of the optical waveguide 373. In this case, the optical waveguide end face has a leading shield gap LSG in the range of $(1/7)X_1$ to $(7/7)X_1$. The light energy density $U_{LSG}$ is also relatively expressed based on a light energy density $\alpha$ of the incident light 52 to be transmitted to the near-field light generating element 37 when the leading shield gap LSG is $(3/7)X_1$. Referring to FIG. 8, there is a significant drop when the value of the leading shield gap LSG is about $(4/7)X_1$. This is because when the leading shield gap LSG is small, the incident light 52 can be more affected by reflection and scattering due to the intrusive part 375 of the leading shield 352. The decrease in light energy density $U_{LSG}$ is, of course, undesirable because it leads to a decrease in propagative efficiency, making it difficult to heat the magnetic recording medium close to the Curie point, which results in a decrease in effective magnetic field gradient. In this regard, when the leading shield gap LSG is equal to or more than $4/7X_1$, i.e., when the area S1 of the covered part 3751 is equal to or less than one-half of the area S2 of the optical waveguide end face 3731, the effective magnetic field gradient can be balanced within a high range while keeping high the light energy density $U_{LSG}$, i.e., while preventing a decrease in propagative efficiency.

The leading shield 352 is located above the medium-facing surface 311 and preferably has a thickness of 0.05 μm to 0.25 μm as measured from the medium-facing surface 311. Also when increasing a height (leading shield height LSH) of the leading shield 352 except the intrusive part in FIG. 7, there is the same problem as considering the design range of the above leading shield gap LSG. That is, the larger the leading shield height LSH is, the more the recording magnetic field increases, which results in increasing the recording magnetic field gradient but also leads to reflection and scattering of the incident light 52 in the optical waveguide 373, thereby causing a decrease in propagative efficiency. The decrease in propagative efficiency is undesirable because heating close to the Curie point becomes difficult and, as a result, the effective magnetic field gradient decreases. In this regard, FIG. 9 is a graph showing a relationship between the leading shield height LSH and a light energy density $U_{LSH}$ of the incident light 52 to be transmitted to the near-field light generating element 37. Referring to FIG. 9, there is a significant drop in light energy density $U_{LSH}$ when the leading shield height LSH exceeds 0.25 μm. On the other hand, when the leading shield height LSH is set to be from 0.05 μm to 0.25μ, the effective magnetic field gradient can be balanced within a high range while keeping high the light energy density $U_{LSH}$ and preventing a decrease in propagative efficiency.

Figure 10:
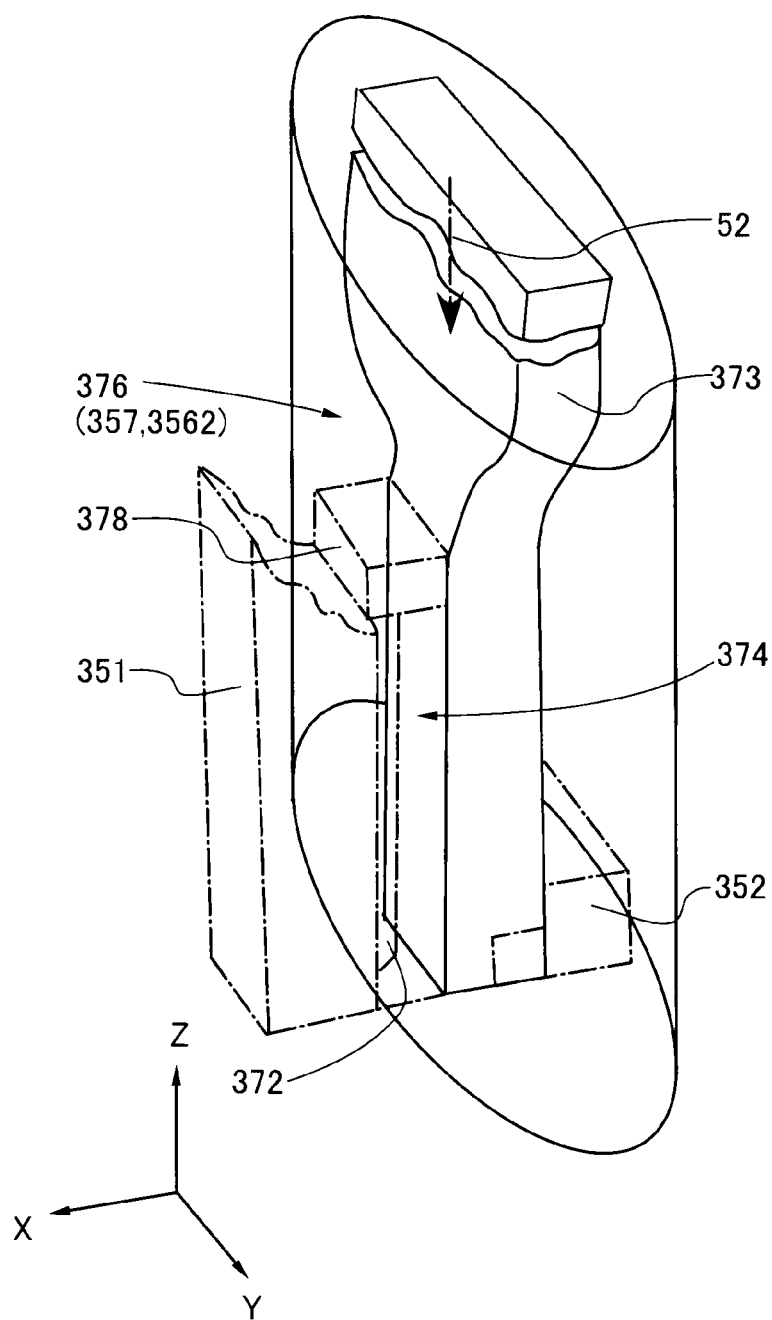
FIG. 10 is a perspective view in which an optical waveguide and other adjacent elements in FIG. 3 are enlarged.
Figure 11:
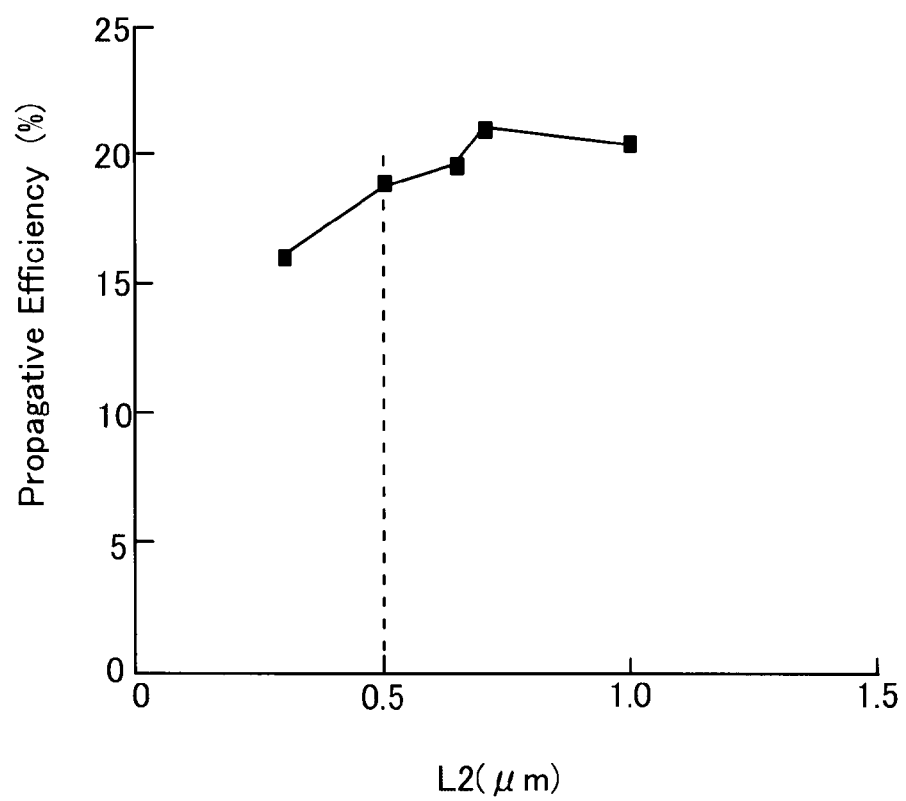
FIG. 11 is a graph showing a relationship between a propagative efficiency and a distance L2 of a metallic body from an optical waveguide.

Next will be described the structure of the optical waveguide 373 with reference to FIGS. 10 and 11. The optical waveguide 373 is covered with a protective layer 376 except the optical connection 374, and the protective layer 376 has a lower refractive index than the optical waveguide 373. On the other hand, FIG. 11 is a graph showing a relationship between a propagative efficiency and a distance L2 of a metallic body (other than the near-field light generating element 37, the main pole 351 and the leading shield 352) from the optical waveguide 373. The distance L2 of the metallic body is a distance from a boundary between the optical waveguide 373 and the protective layer 376. Referring to FIG. 11, there is a several percent drop in wave guide efficiency when the distance L2 of the metallic body is equal to or less than 0.5 μm. Therefore, it is preferable that no metallic material other than the near-field light generating element 37, the main pole 351 and the leading shield 352 exists within 0.5 μm from the boundary between the optical waveguide 373 and the protective layer 376. The protective layer 376 includes the foundation layer 357 and the through hole insulating layer 3562.

With this configuration, propagation loss of the incident light 52 can be reduced by good optical properties of the material itself. That is, high propagation efficiency of the incident light 52 can be realized by the effect of confining the incident light 52 due to the difference in refractive index, which results in increasing the waveguide efficiency. For example, the optical waveguide 373 comprises a dielectric material. In the case where the laser beam has a wavelength of 600 nm and the protective layer 376 comprises $Al_2O_3$ (n=1.63), for example, the optical waveguide 373 may comprise $SiO_xN_y$ (n=1.7 to 1.85), $TaO_x$ (n=2.16), $NbO_x$ (n=2.33) or $TiO_x$ (n=2.3 to 2.55). Thus, total reflection conditions can be satisfied at all sides of the optical wave guide 373.

2. Thermally Assisted Magnetic Head Device

The present invention further discloses a thermally assisted magnetic head device. The thermally assisted magnetic head device according to the present invention includes the foregoing thermally assisted magnetic head 1 and a head support device 71. The head support device 71 supports the thermally assisted magnetic head 1 in such a manner as to permit rolling and pitching of the head. In the present invention, examples of the head assembly include an HGA (head gimbal assembly) 72 in which the thermally assisted magnetic head 1 is mounted on the head support device 71 (gimbal) and an HAA (head arm assembly) 73 in which the HGA 72 is mounted on an arm 715.

Figure 12:
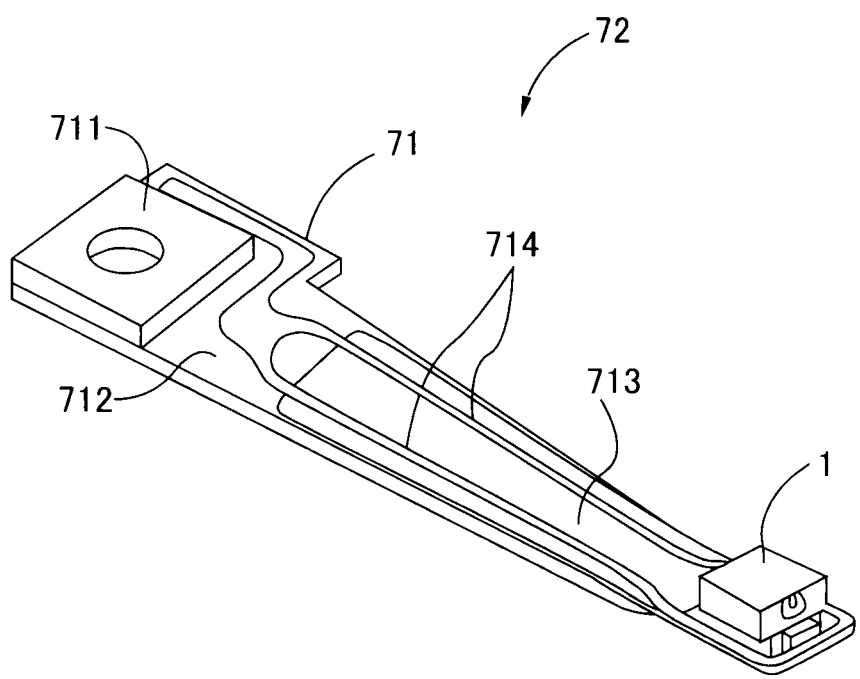
FIG. 12 is a perspective view of a head gimbal assembly (HGA) in which a thermally assisted magnetic head according to the present invention is mounted.

FIG. 12 is a perspective view of the HGA 72 according to the present invention. The illustrated HGA 72 includes a suspension 711 and the thermally assisted magnetic head 1. The suspension 711 has a load beam 712 and a flexure 713. The flexure 713 is formed from a thin leaf spring and attached at one side to the load beam 712. The thermally assisted magnetic head 1 is attached to the other side of the flexure 713. The thermally assisted magnetic head 1 is attached to one side of the flexure 713 by means of an adhesive or the like. A flexible cable part 714 or the like is connected to the thermally assisted magnetic head 1.

Figure 13:
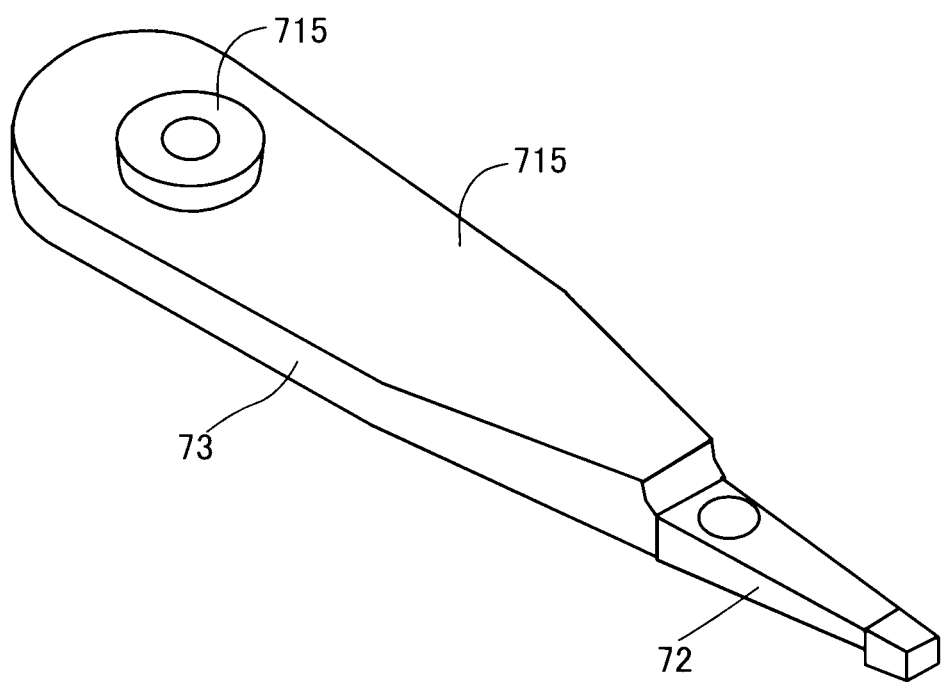
FIG. 13 is a perspective view of a head arm assembly (HAA) in which the HGA of FIG. 12 is mounted.

FIG. 13 is a perspective view of the HAA 73. The illustrated HAA 73 includes the HGA 72 and the arm 715. The arm 715 is integrally formed using a suitable non-magnetic metallic material such as aluminum alloy. The arm 715 has an attachment hole 716. The attachment hole 716 can be used for attachment to an assembly carriage 95 included in a magnetic recording/reproducing apparatus of FIG. 14. One end of the HGA 72 is secured to the arm 715, for example, with a ball connecting structure.

3. Magnetic Recording/Reproducing Apparatus

A magnetic recording/reproducing apparatus according to the present invention includes a magnetic head device and a magnetic recording medium 91. As described above, FIG. 14 shows a typical structure of a magnetic recording/reproducing apparatus. This magnetic recording/reproducing apparatus 9 incorporates the foregoing thermally assisted magnetic head 1 and is, for example, a hard disk drive.

Figure 14:
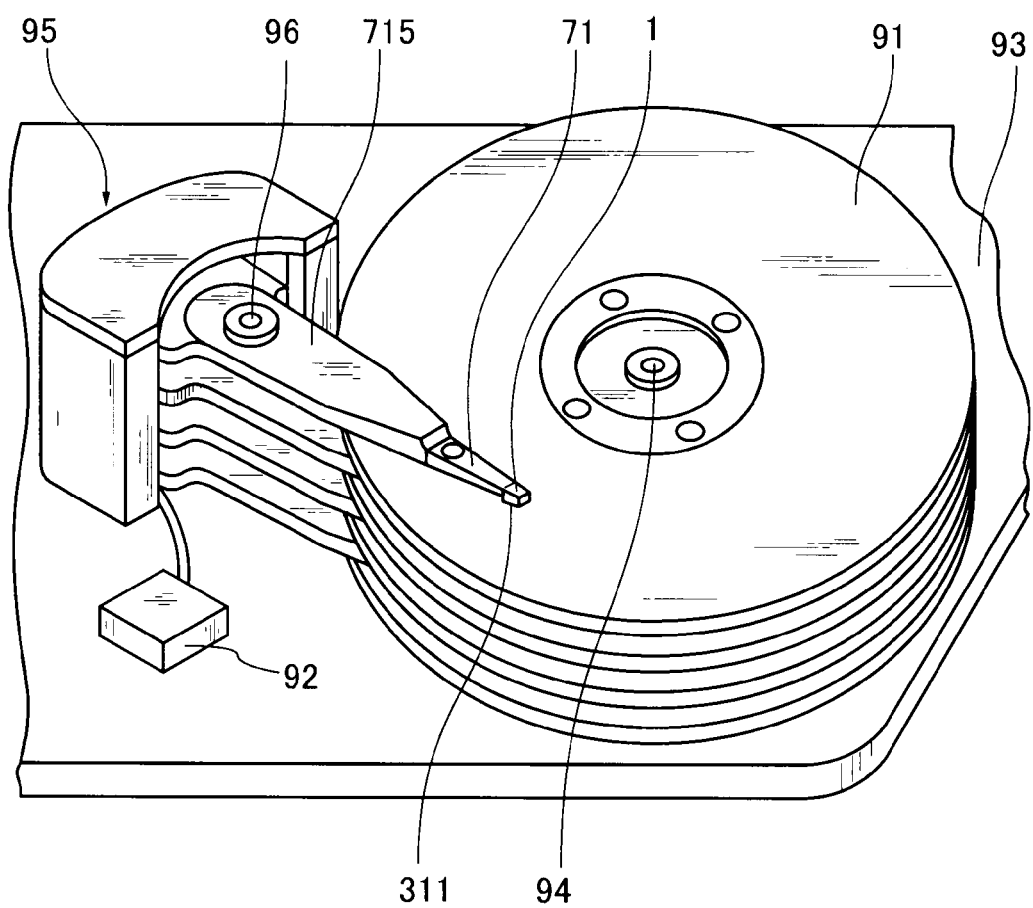
FIG. 14 is a perspective view of a magnetic recording/reproducing apparatus in which the HAA of FIG. 13 is employed.

As shown in FIG. 14, for example, the magnetic recording/reproducing apparatus includes, within a case 93, magnetic recording media 91, a plurality of suspensions 711 disposed for each magnetic recording medium 91 and supporting the thermally assisted magnetic head 1 at its one end, and a plurality of arms 715 supporting the other end of the suspension 711. The magnetic recording media 91 are rotatable about a spindle motor 94 which is fixed to the case 93. The arms 715 are connected to the assembly carriage 95 and are pivotable about a pivot bearing 96 which is fixed to the case 93.

The assembly carriage 95 includes, for example, a driving source such as a voice coil motor. This magnetic recording/reproducing apparatus is, for example, of the type in which a plurality of arms 715 are integrally pivotable about the pivot bearing 96. In FIG. 14, the case 93 is shown in a partially cut-away state, thereby making it easy to see the internal structure of the magnetic recording/reproducing apparatus.

The thermally assisted magnetic head 1 is the thermally assisted magnetic head 1 according to the present invention. When the magnetic recording medium 91 rotates for recording or reproducing information, the thermally assisted magnetic head 1 takes off from the recording surface of the magnetic recording medium 91 utilizing an air flow generated between the recording surface (the surface facing the thermally assisted magnetic head 1) of the magnetic recording medium 91 and the ABS 311 and then performs magnetic recording or reproducing operations.

In the magnetic recording/reproducing apparatus according to the present invention, the thermally assisted magnetic head 1 is connected to a control circuit 92, and the control circuit 92 controls magnetic recording and reproducing operations with the magnetic recording medium 91.

The present invention has been described in detail above with reference to preferred embodiments. However, obviously those skilled in the art could easily devise various modifications of the invention based on the technical concepts underlying the invention and teachings disclosed herein.

What is claimed is:

1. A thermally assisted magnetic head comprising a recording element and a near-field light generating element, wherein
    the recording element includes a main pole and a leading shield,
    the leading shield is located on a leading side of the main pole,
    the near-field light generating element is located on the leading side of the main pole and includes a surface plasmon generating element and an optical waveguide,
    the surface plasmon generating element is located between the main pole and the leading shield,
    the optical waveguide is located between the surface plasmon generating element and the leading shield extending in a direction away from a medium from an optical waveguide end face of the optical waveguide appearing on a medium-facing surface and has an optical connection with a leading side of the surface plasmon generating element, and
    the leading shield has an intrusive part into the optical waveguide end face and an area of the intrusive part is equal to or less than one-half of an area of the optical waveguide end face.

2. The thermally assisted magnetic head as claimed in claim 1, wherein the optical waveguide is covered with a protective layer except the optical connection and the protective layer has a lower refractive index than the optical waveguide, wherein no metallic material other than the near-field light generating element, the main pole and the leading shield exists within 0.5 µm from a boundary between the optical waveguide and the protective layer.

3. The thermally assisted magnetic head as claimed in claim 1, wherein the recording element includes an upper yoke layer, a write coil layer and a lower yoke layer, the main pole is magnetically connected to the upper yoke layer and the lower yoke layer, and the lower yoke layer is located on a leading side of the leading shield.

4. The thermally assisted magnetic head as claimed in claim 1, wherein the optical waveguide is optically connected to a laser diode.

5. The thermally assisted magnetic head as claimed in claim 1, including a reproducing element.

6. A magnetic head device comprising a thermally assisted magnetic head and a head support device,
    the thermally assisted magnetic head being a thermally assisted magnetic head as claimed in claim 1,
    the head support device supporting the thermally assisted magnetic head.

7. A magnetic recording/reproducing apparatus comprising a magnetic head device and a magnetic recording medium,
    the magnetic head device being a magnetic head device as claimed in claim 6 and capable of performing magnetic recording and reproducing a magnetic record with the magnetic recording medium.

8. The magnetic recording/reproducing apparatus as claimed in claim 7, further including a control circuit, the control circuit being capable of controlling writing and reproducing operations of the magnetic head device with the magnetic recording medium.

9. The thermally assisted magnetic head as claimed in claim 1, wherein
    the recording element includes a bit inversion starting region which is intended to be a maximum recording magnetic field generating position and formed at a leading edge of the main pole appearing on the medium-facing surface,
    the leading shield is magnetically connected to the main pole,
    the near-field light generating element is able to create a heating spot due to a near-field light on a near-field light generating end face appearing on the medium-facing surface, and
    the bit inversion starting region is located within one-half of a diameter of the heating spot from a center of the heating spot.

10. The thermally assisted magnetic head as claimed in claim 9, wherein in the heating spot, the main pole does not generate a magnetic field capable of causing reinversion of recorded magnetization on a trailing side of the bit inversion starting region.

11. A thermally assisted magnetic head comprising a recording element and a near-field light generating element, wherein
    the recording element includes a main pole and a leading shield,
    the leading shield is located on a leading side of the main pole and located above a medium-facing surface and has a thickness of 0.05 µm to 0.25 µm as measured from the medium-facing surface,
    the near-field light generating element is located on the leading side of the main pole,
    the recording element includes a bit inversion starting region which is intended to be a maximum recording magnetic field generating position and formed at a leading edge of the main pole appearing on the medium-facing surface,
    the leading shield is magnetically connected to the main pole,
    the near-field light generating element is able to create a heating spot due to a near-field light on a near-field light generating end face appearing on the medium-facing surface, and the bit inversion starting region is located within one-half of a diameter of the heating spot from a center of the heating spot.

12. The thermally assisted magnetic head as claimed in claim 11, wherein in the heating spot, the main pole does not generate a magnetic field capable of causing reinversion of recorded magnetization on a trailing side of the bit inversion starting region.

13. The thermally assisted magnetic head as claimed in claim 11, wherein the recording element includes an upper yoke layer, a write coil layer and a lower yoke layer, the main pole is magnetically connected to the upper yoke layer and the lower yoke layer, and the lower yoke layer is located on a leading side of the leading shield.

14. The thermally assisted magnetic head as claimed in claim 11, including a reproducing element.

15. A magnetic head device comprising a thermally assisted magnetic head and a head support device,
the thermally assisted magnetic head being a thermally assisted magnetic head as claimed in claim 11,
the head support device supporting the thermally assisted magnetic head.

16. A magnetic recording/reproducing apparatus comprising a magnetic head device and a magnetic recording medium,
the magnetic head device being a magnetic head device as claimed in claim 15 and capable of performing magnetic recording and reproducing a magnetic record with the magnetic recording medium.

17. The magnetic recording/reproducing apparatus as claimed in claim 16, further including a control circuit, the control circuit being capable of controlling writing and reproducing operations of the magnetic head device with the magnetic recording medium.

* * * * *